United States Patent [19]

Fruit

[11] Patent Number: 4,850,391
[45] Date of Patent: Jul. 25, 1989

[54] FLOW CONTROL VALVE

[75] Inventor: Jerry L. Fruit, Kingsland, Tex.

[73] Assignee: Mensor Corporation, San Marcos, Tex.

[21] Appl. No.: 6,994

[22] Filed: Jan. 27, 1987

[51] Int. Cl.$^4$ .............................................. G05D 7/01
[52] U.S. Cl. .............................. 137/505.25; 137/494;
137/505.13; 137/596.18; 251/901
[58] Field of Search ................... 137/494, 501, 596.18,
137/625.38, 863, 505.13, 505.25; 281/61, 901

[56] References Cited

U.S. PATENT DOCUMENTS

| | | | |
|---|---|---|---|
| 2,720,218 | 10/1955 | Otto ................................... | 251/61 X |
| 2,849,026 | 8/1958 | Taplin . | |
| 2,950,733 | 8/1960 | Perkins ............................. | 137/501 X |
| 3,070,108 | 12/1962 | Fischer .................................. | 137/102 |
| 3,403,603 | 10/1968 | Turner . | |
| 3,766,933 | 10/1973 | Nicholson ........................ | 251/901 X |
| 3,783,745 | 1/1974 | Meijer et al. . | |
| 3,994,314 | 11/1976 | Hartley ............................ | 251/901 X |
| 4,092,998 | 6/1978 | Taplin ............................... | 251/901 X |
| 4,125,127 | 11/1978 | Harter . | |
| 4,390,036 | 6/1983 | Athanassiu et al. ............ | 251/901 X |
| 4,428,392 | 1/1984 | Jones et al. . | |

FOREIGN PATENT DOCUMENTS 1650608 9/1970 Fed. Rep. of Germany ...... 251/901

Primary Examiner—Gerald A. Michalsky
Attorney, Agent, or Firm—Arnold, White & Durkee

[57] ABSTRACT

A fluid flow control valve meters, in response to a fluid control signal, fluid flow received at a supply pressure and released at an output pressure utilizing a folded elastomeric diaphragm as the fluid flow metering member. The diaphragm regulates fluid flow through a passageway in a piston disposed in a valve body, which passageway provides for fluid communication between a fluid supply port and a fluid output port. The piston is displaced as a function of control signal fluid pressure, which in turn produces a change in the relationship between the folded-over portion of the diaphragm and an outlet duct of the piston passageway.

19 Claims, 5 Drawing Sheets

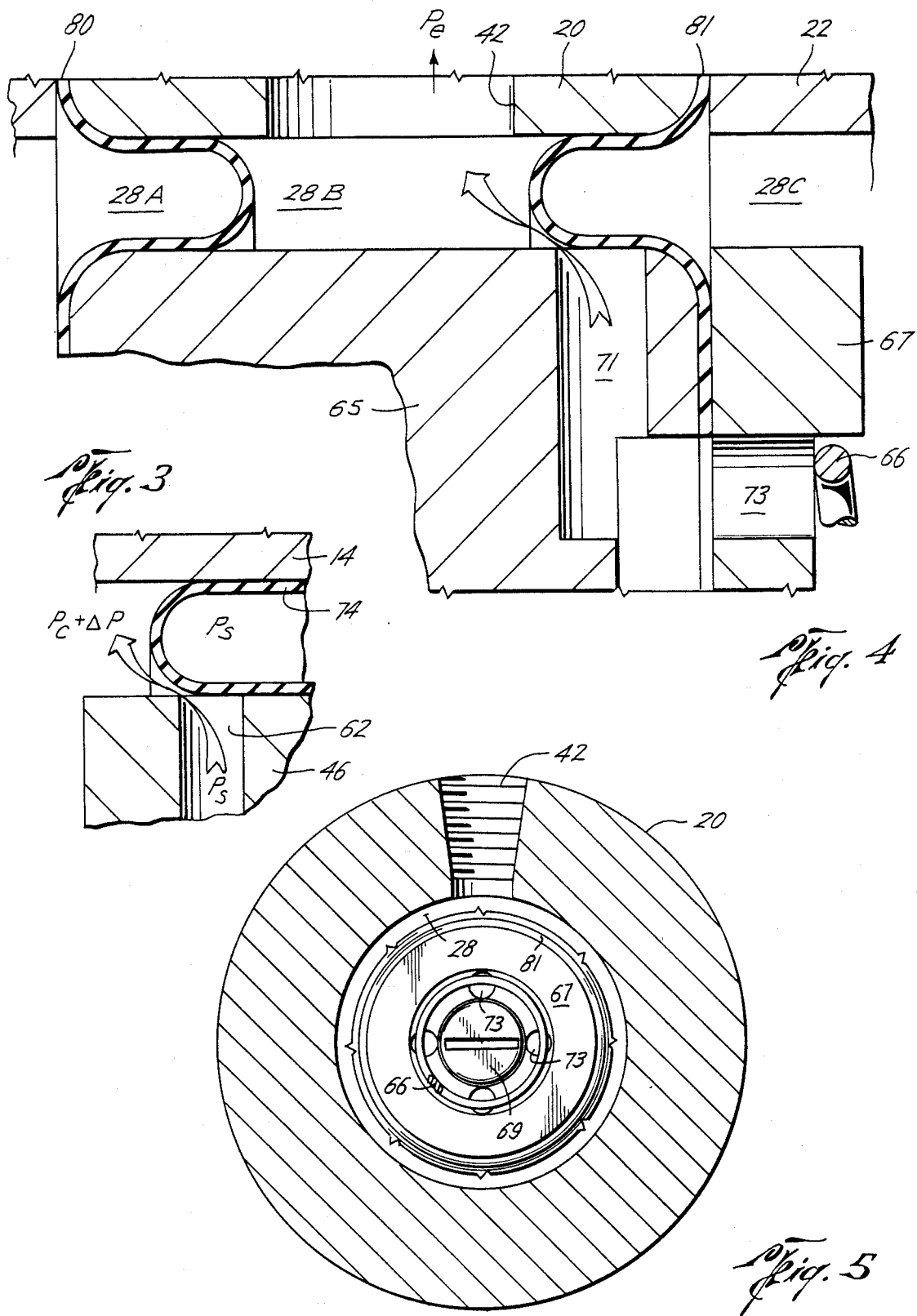

FLOW CONTROL VALVE

BACKGROUND OF THE INVENTION

This invention relates to pressure regulating devices, and more particularly, it relates to an improved control valve for metering fluid flow in response to a control fluid pressure signal.

Metering valves provide adjustment of fluid flow between a source of higher fluid pressure and a volume of lower pressure fluid. Accurate fluid flow control requires that the metering member not oscillate in turbulent flow, because oscillation causes the fluid flow to become unstable. Furthermore, a metering valve must be able to completely close the fluid flow path, shutting off fluid flow. A precise fit is required between metering members and the borehole to ensure a proper closing seal and no oscillation. In prior art valves, fluid flow metering is achieved by use of a tapered plunger or ball which is moved within a borehole in the fluid flow path. Such valves typically do not have the precise fit between the metering member and borehole required for good fluid flow metering. Because of tolerance build-up a certain looseness of mating parts is required for the parts to be self-aligning so as to completely close. This looseness permits movement of the parts and though not intended, movement due to the turbulence of flowing fluid medium. This movement of the control element imparts an oscillating characteristic to the flow and pressure of the fluid.

SUMMARY OF THE INVENTION

In accordance with the present invention, a control valve for metering fluid flow in response to a fluid pressure control signal utilizes a rolling diaphragm as the metering member. The diaphragm rolls with essentially no friction across the opening of a fluid passageway and varies the cross-sectional area of the opening, thereby metering the flow of fluid therethrough. In an embodiment of the valve, the diaphragm regulates flow through a fluid passageway in a piston providing fluid communication between a supply pressure fluid port and an output pressure fluid port. As the piston is moved, the diaphragm adjusts the fluid flow through the piston passageway. Piston displacement within the valve body is a function of the force of a control signal, such as, for example, pressure of a control fluid signal. Accordingly, the diaphragm regulates fluid flow to establish an output fluid pressure as a function of the control signal fluid pressure.

The diaphragm preferably comprises a folded-over elastomeric member disposed between the piston and the valve body. The folded portion covers a variable portion of the outlet duct of the piston fluid passageway depending upon piston location within the valve body cavity.

In a preferred embodiment, another diaphragm is provided in the control valve structure for sealing between the control signal pressure fluid port and the supply pressure fluid port. Also, a spring is provided for biasing the piston to an initial displacement location within the valve body cavity, so as to establish an initial output fluid pressure.

In another embodiment of the present invention, the valve body is provided with a port for the release of fluid at an exhaust pressure and a port for receiving fluid at an inlet pressure in addition to the supply, control and output fluid ports. A second piston is disposed within the valve body cavity for movement therein in response to control signal fluid pressure, and a second diaphragm regulates fluid flow between the input fluid pressure port and the exhaust fluid pressure port as a function of the displacement of the second piston, to thereby establish the exhaust fluid pressure as a function of the control signal fluid pressure. Additionally, a spring is provided for biasing the second piston to an initial displacement location within the valve body cavity, so as to establish an initial exhaust fluid pressure. This structure provides a controlled pressure at a fixed level below the control pressure.

In yet another embodiment of the present invention, an electrical coil is provided for biasing the piston to an initial displacement location within the valve body cavity. Electrical current flowing through the coil generates an electrical field which acts against a magnet fixed within the cavity. By varying current flow through the coil, the piston can be variably biased within the cavity.

With any of the embodiments, accurate fluid flow metering without oscillation and the capability to completely shut-off fluid flow are attainable. Also, a control valve in accordance with the present invention provides flow metering in proportion to differential pressure changes.

BRIEF DESCRIPTION OF THE DRAWINGS

A written description setting forth the best mode presently known for carrying out the present invention, and of the manner of implementing and using it, is provided by the following detailed description of an illustrative embodiment shown in the attached drawings wherein:

FIG. 3 is a diagram illustrating fluid flow metering through the port in the valve of FIG. 2 provided for releasing fluid from the valve body at an output pressure;

FIG. 4 is a diagram illustrating fluid flow metering through the port in the valve of FIG. 2 provided for releasing fluid at an exhaust pressure;

FIG. 5 is a transverse, cross-sectional view of the control valve structure shown in FIG. 2;

DETAILED DESCRIPTION OF ILLUSTRATIVE EMBODIMENTS

Figure 1:
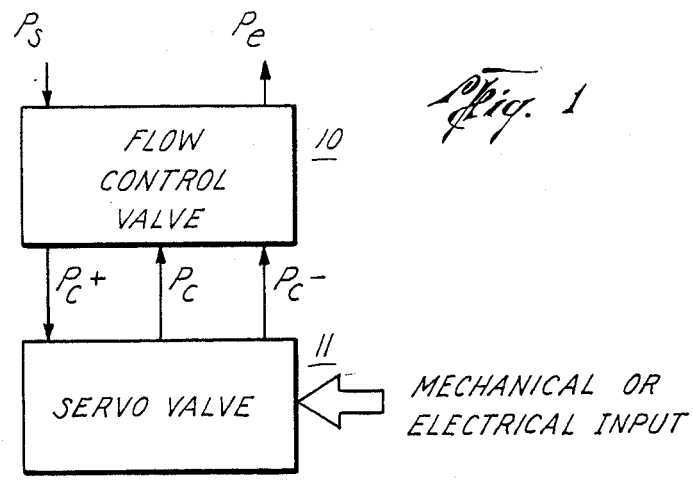
FIG. 1 is a diagram illustrating interconnection of a flow control valve in accordance with the present invention with a servo valve.

Referring first to FIG. 1, a fluid control valve 10 in accordance with the present invention is advantageously used in conjunction with a servo valve 11 to provide regulated pressures above and below, i.e., $P_c+$ and $P_c-$, a controlling pressure, $P_c$. As shown, the flow control valve 10 receives fluid at a supply pressure, $P_s$, and releases fluid at an exhaust pressure, $P_e$.

Figure 2:
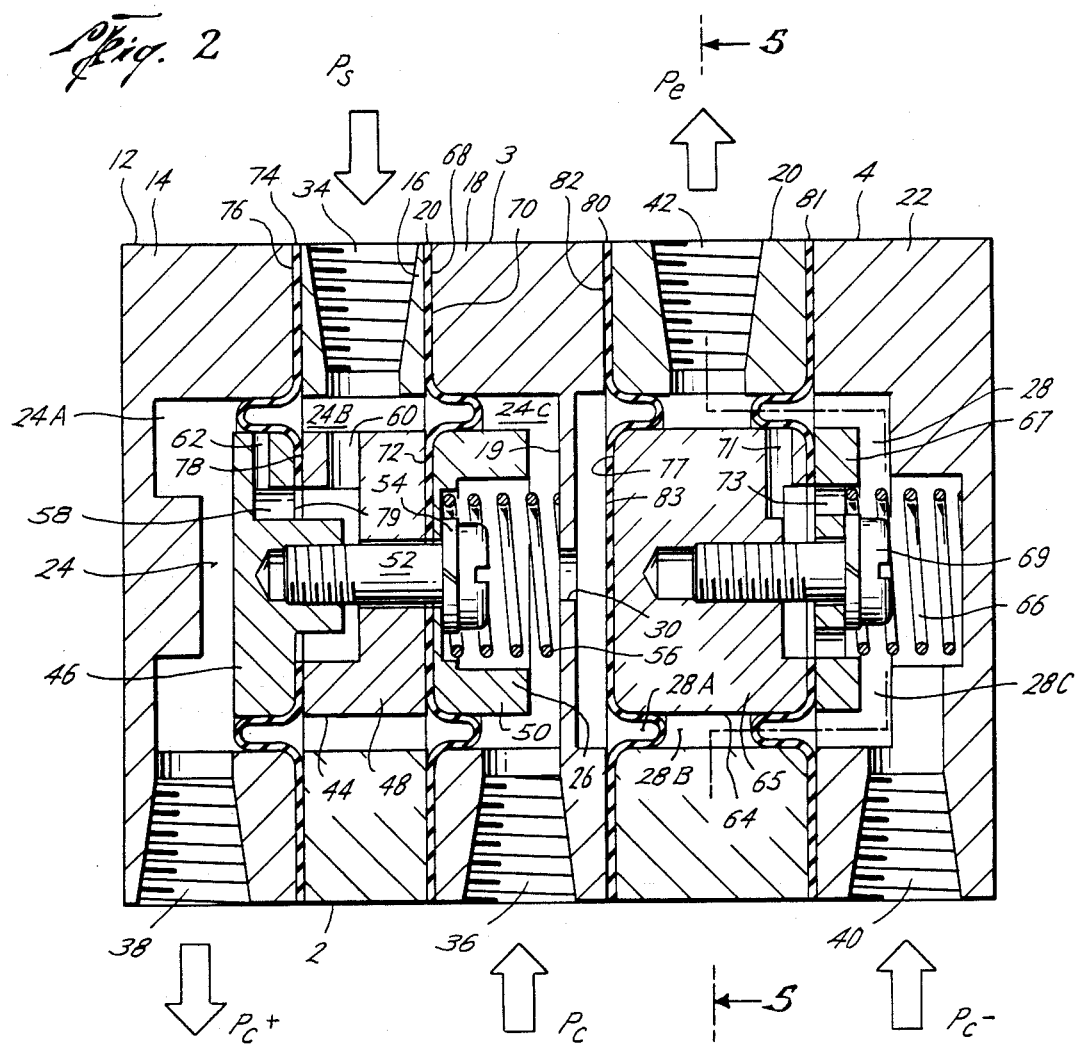
FIG. 2 is a cross-sectional view of an embodiment of a control valve in accordance with the present invention.

Referring now to FIG. 2, a detailed illustration of structure for implementing flow control valve 10 in accordance with the present invention is shown. Valve 10 includes a valve body 12. As shown, the valve body includes separate but interconnected valve body portions 14, 16, 18, 20, and 22. Together valve body sections 12, 16, and 18 define an internal cavity 24. The internal cavity 24 itself includes separate chamber areas 24A, 24B, and 24C. Similarly, valve body sections 18, 20, and 22 together define an internal cavity 28 having separate chamber areas 28A, 28B, and 28C. The chamber areas 24A and 24B are separated by a diaphragm 74. Similarly, chamber areas 24B and 24C are separated by a diaphragm 68. Chamber areas 28A and 28B are separated by a diaphragm 80, and chamber areas 28B and 28C are separated by a diaphragm 81. Valve body 12 has a port 34 in section 16 for receiving fluid at a supplied pressure, $P_s$; a port 36 in section 18 for receiving fluid at a control signal pressure, $P_c$; a port 38 in section 14 for releasing fluid at an output pressure above the control signal pressure, $P_c+$ where $P_c+ = P_c+P$; a port 40 in section 22 for receiving fluid at an input pressure below the control signal pressure, $P_c-$ where $P_c- = P_c-P$; and a port 42 in section 20 for releasing fluid at an exhaust pressure, $P_e$. As shown, port 34 opens into chamber area 24B. Port 36 opens into chamber area 24C, and 38 opens into chamber area 24A. Similarly, port 40 opens into chamber area 28C and port 42 communicates with area 28B.

Disposed within cavity 24 is a piston assembly generally designated by the reference numeral 44. The piston includes portions 46, 48, and 50. A bolt 52 secures the three portions of the piston together Also, bolt 52 secures a retainer ring 54 comprising a washer with an attached seal to prevent fluid flow around the head of the bolt. Additionally, the piston sections are separated by diaphragms 74 and 68. A coil spring 56 is retained with a recess in piston section 50. The piston assembly further includes a fluid passageway 58 having an inlet duct 60 and an outlet duct 62. Passageway 58 provides fluid communication between the supply fluid port 34 and the outlet pressure fluid port 38 via cavity chamber area 24A.

Piston assembly 44 is free to move axially in response to pressure differences between chamber areas 24A and 24C. The pressure $P_s$ in chamber 24B has no effect on piston assembly displacement except to concentrically center the piston within cavity 24 and to seal diaphragm 74 around outlet duct 62. The pressure in port 62 is obtained from chamber area 24B and there is no net force to extrude diaphragm 74 into port 62 or to lift diaphragm 74 therefrom, which avoids leakage.

A second piston 64 is disposed within cavity 28. A second coil spring 66 is connected to piston 64 for biasing the piston to an initial displacement location within the valve body. Piston 64 is of somewhat similar construction to piston 44 and includes piston sections 65 and 67 interconnected by bolt 69. A passageway 71 is defined through piston 64, which passageway has inlet duct openings 73 around the head of bolt 69 and an exhaust pressure outlet duct 71. Diaphragm 80 abuts the back wall 77 of piston 64, and diaphragm 81 is held between and separates piston sections 65 and 67.

Considering now in more detail the various diaphragm members, it will be observed that diaphragm 68 provides a means for sealing between the supply pressure fluid port 34 and the control signal pressure fluid port 36. Preferably, and as shown, the diaphragm comprises a folded elastomeric member disposed within the annular space defined between the outer surface of piston section 50 and the internal surface of valve body section 18. Diaphragm 68 is generally formed in the shape of a truncated cone with a portion 70 of its length being secured between abutting portions of valve body sections 16 and 18. Another portion 72 of diaphragm 68 is secured between abutting portions of piston assembly sections 48 and 50. Accordingly, as piston 44 is moved axially within valve body cavity 24, diaphragm 68 moves in a free-rolling action. The sealing means can, however, be an O-ring or other suitable structure.

Diaphragm 74 is similar to diaphragm 68 and is disposed between the piston and the valve body. A portion 76 of diaphragm 74 is secured between abutting ends of valve body sections 14 and 16; and a portion 78 is secured between abutting surfaces of piston assembly portions 46 and 48. Also, an opening 79 is provided through diaphragm portion 78 to allow for fluid communication through passageway 58.

As piston assembly 44 is moved within cavity 24, the folded elastomeric member comprising diaphragm 74 moves in a rolling motion. The folded portion as explained previously remains in contact with the outer surface of piston section 46 and in contact with the inner surface of valve body section 14. The folded portion of diaphragm 74 proximate the outlet duct 62 of passageway 58 covers a variable portion of the duct depending upon piston location within the valve body cavity. This is illustrated in the drawing of FIG. 3. As the piston moves to the left under the influence of fluid entering port 36 at a control signal pressure, piston 44 moves to the left, which unseals outlet duct 62 and permits fluid flow from the supply pressure source to be metered through to outlet port 38.

Diaphragm 80 is also a folded, elastomeric member. The folded portion is disposed within the annular space defined between the outer surface of piston 64 and the internal surface of valve body section 20. A portion 82 of diaphragm 80 is secured between abutting surface of valve body sections 18 and 20. A portion 83 of the diaphragm on the other side of the folded portion from portion 82 may be secured or held by pressure to the end surface 77 of piston 64 opposite spring 66. Axial displacement of piston 64 within valve body cavity 28 produces rolling action of the folded portion of diaphragm 80. The folded portion of diaphragm 81 proximate port 42 regulates fluid flow therethrough as illustrated in the diagram of FIG. 4.

Referring briefly to FIG. 5, an end cross-sectional view of valve 10 is shown. The cross-sectional view is taken along the lines 5—5 shown in FIG. 2. Although a circular outer valve body configuration is shown, the valve body may be otherwise configured.

Referring again to FIG. 2, in use, fluid at a supply pressure, $P_s$, is applied to port 34. Spring 56 has a spring constant established so as to bias piston 44 to the left and open duct 62 of passageway 58 slightly to permit the metering of fluid flow from port 34 to outlet port 38. If the control signal fluid pressure, $P_c$, is zero, the pressure established at port 38 will be that required to equalize the spring 56 biasing force. This initial pressure offset may be referred to as P = spring force at balance/diaphragm area. Also to be noted is that the supply fluid pressure, $P_s$, acts equally on diaphragms 68 and 74 so that no net force results to cause dislocation of the piston. Also, because the pressure at outlet port 38 is less than $P_s$, diaphragm 74 tightly seals against the surrounding surfaces. It is to be noted that the edge of duct 62 is aligned at the tangent of the roll of diaphragm 74 at the inception of flow from duct 62 to chamber 24A. The initial condition is of course established by the force of spring 56, which force divided by the effective area of diaphragm 68 equals the differential pressure between $P_c+$ at port 38 and $P_c$ at port 36. The requisite spring force is determined by multiplying the desired differential pressure ($P_c+ - P_c$) by the effective area of diaphragm 68. By adjusting the distance between piston portion 50 and the partition wall 19 of valve body section 18, the spring force can be established at the requisite strength.

At startup, spring 56 pushes piston assembly 44 so as to open duct 62 and allow source pressure $P_s$ to flow into chamber 24A and out port 38.

As the control signal pressure, $P_c$, increases to $P_c+ = P_c + P$, piston assembly 44 is forced farther to the left. Diaphragm 74 rolls off piston portion 46 and further opens outlet duct 62, which increases pressure at outlet port 38 to and remains open until a pressure equal to $P_c+$ is reached. Any variation in the control signal pressure, $P_c$, results in movement of piston 44, which in turn adjusts fluid flow through outlet duct 62 so as to alter the outlet fluid pressure at port 38. A decrease in the control pressure causes diaphragm 74 to keep duct 62 closed until a pressure is reached within chamber 24A which balances piston 44.

Control signal fluid pressure, $P_c$, introduced through port 36 also acts on piston 64 in a similar manner. However, spring 66 resists axial movement of piston 64 until the control signal pressure, $P_c$, exceeds the spring force plus the pressure in chamber 28C. Accordingly, the pressure into port 40 required to balance the piston against control signal fluid pressure is $P_c - P$, where P represents the offset force of spring 66. Piston 64 moves to the left when control signal fluid pressure $P_c$ decreases. This results in diaphragm 81 opening the exhaust port 71 to exhaust pressure $P_e$ in chamber 28B which is less than either $P_c$ or $P_c-$ in chamber 28C.

The valve shown in FIG. 2 is particularly useful with a servo pressure valve which requires source and exhaust pressures a fixed amount above and below the pressure it controls. Importantly, the servo valve is permitted to control over a wide range of pressure with constant gain settings. When controlling at a constant pressure level, the servo valve bleeds a small amount of fluid from $P_c+$ to $P_c-$, which requires ducts 62 and 75 to be slightly open. Also, $P_s$ is higher than any desired controlled pressure $P_c$ by a minimum of $P_s+$. $P_e$ is lower than any desired controlled pressure $P_c$ by a minimum of $P_c-$. With the valve fully open, $P_c$ will achieve $P_s$, or if fully closed, $P_c$ will achieve $P_e$.

Figure 6:
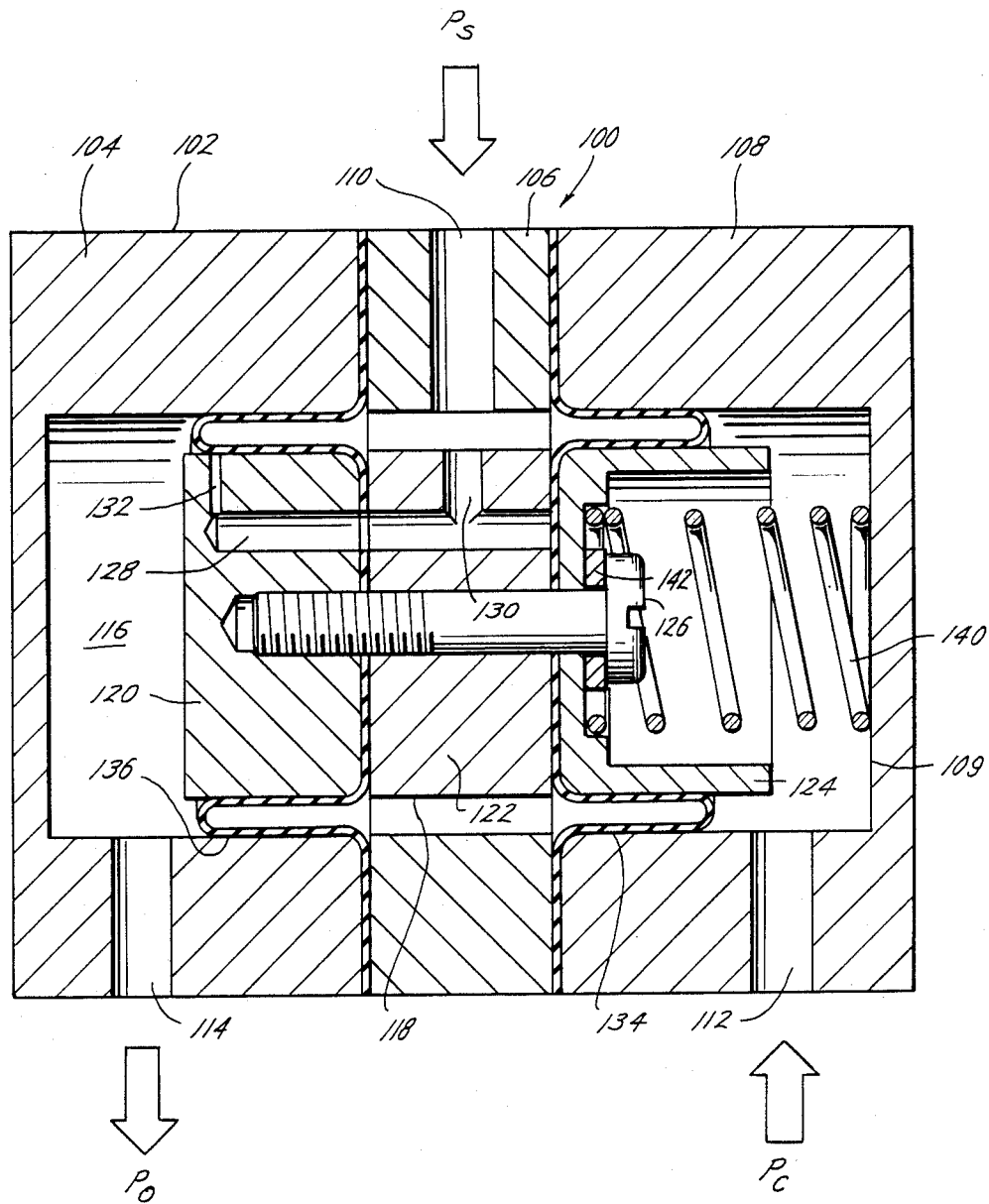
FIG. 6 is a cross-sectional view of another embodiment of a control valve in accordance with the present invention for metering fluid flow, which valve provides fluid flow metering of fluid at a supply pressure under control of a control signal fluid pressure.

The basic valving mechanism of the present invention is not limited to a control valve for use with a servo pressure valve. A control valve in accordance with the present invention may be used in a variety of control situations and configurations. Referring to FIG. 6, there is shown an alternate embodiment of a valve in accordance with the present invention in which an outlet pressure, $P_o$, is established from a source of supply pressure, $P_s$, in response to a control signal pressure, $P_c$.

Valve 100 shown in FIG. 6 includes a valve body 102 comprising valve body sections 104, 106, and 108. A port 110 is provided in valve body section 106 for receiving fluid at a supply pressure. Port 112 in valve body section 108 is provided for receiving fluid at a control signal pressure. Port 114 in valve body section 104 provides for the release of fluid at an output pressure. Ports 110, 112, and 114 open to an internal valve body cavity 116.

A piston assembly 118 is disposed within valve body cavity 116. Piston 118 has three interconnected parts 120, 122, and 124 secured together by a bolt 126. Piston 118 further includes a fluid passageway 128 having inlet and outlet ducts 130 and 132 to provide for fluid communication between the supply pressure fluid port 110 and the outlet pressure fluid port 114. Means in the form of a diaphragm 134 is provided for sealing between the supply pressure fluid port 110 and the control signal pressure fluid port 112. As shown, the diaphragm is a folded, elastomeric member secured between piston 118 and valve body 108.

On the opposite side of inlet duct 130 of fluid passageway 128 is a diaphragm fluid flow metering member 136. This diaphragm is similar to diaphragm 134 and has its folded portion disposed within an annular space defined between the outer surface of piston 118 and the internal surface of valve body 102. Further, the folded portion is disposed proximate outlet duct 132. As piston 118 moves axially within valve body cavity 116, diaphragm 136 moves in a free-rolling action with the fold being moved relative to outlet duct 132.

A spring 140 is provided for biasing piston 118 to an initial location within cavity 116. Spring 140 abuts an end wall 109 of valve body section 108 and is retained in a counter bore in piston 124. Seal 142 and bolt 126 hold the piston together.

In use, fluid at a supply pressure is introduced to port 110 of valve 100. A control signal is applied to port 112. Piston 118 is displaced as a function of the control signal fluid pressure. Diaphragm 136 meters fluid flow through outlet duct 132 to establish an equilibrium pressure, $P_c+ = P_c + P$, at output port 114, where P is the pressure equivalent to the force of spring 140 acting on the effective area of the diaphragm.

Valve 100 is useful in a number of control applications such as maintaining a fixed differential pressure across a valve, or maintaining a constant differential pressure across an external restriction to provide a constant flow rate regardless of variations in upstream pressure. The differential pressure between ports 112 and 114 may be changed by configuring the piston assembly so it may be driven electrically, i.e., by a voice coil, or mechanically by displacing spring 140 end 109 by a screw or suitable mechanical means.

Figure 7:
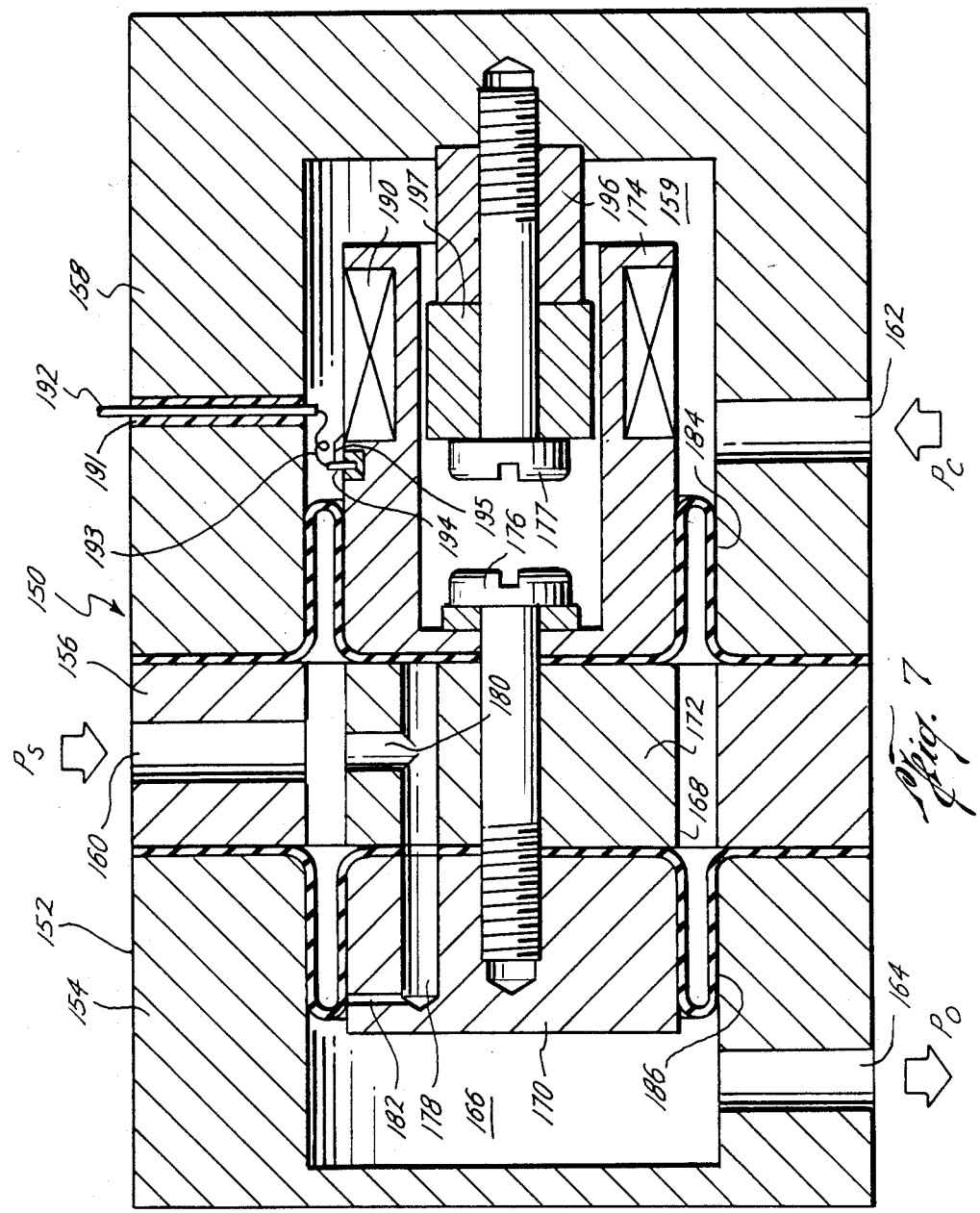
FIG. 7 is a cross-sectional view of another embodiment of a control valve in accordance with the present invention for metering fluid flow, which valve uses an electrical coil for biasing the piston and which provides fluid flow metering of fluids at a supply pressure under control of a control signal fluid pressure.

Valve 150 shown in FIG. 7 includes a valve body 152 comprising valve body sections 154, 156, and 158. A port 160 is provided in valve body section 156 for receiving fluid at a supply pressure. Port 162 in valve body section 158 is provided for receiving fluid at a control signal pressure. Port 164 in valve body section 154 provides for the release of fluid at an output pressure. Ports 160, 162, and 164 open to an internal valve body cavity 166.

A piston assembly 168 is disposed within valve body cavity 166. Piston 168 has three interconnected ports 170, 172, and 174 secured together by a bolt 176. Piston 168 further includes a fluid passageway 178 having inlet and outlet ducts 180 and 182 to provide for fluid communication between the supply pressure fluid port 160 and the outlet pressure fluid port 164. Means in the form of diaphragm 184 is provided for sealing between the supply pressure fluid port 160 and the control signal pressure fluid port 162. As shown, the diaphragm is a folded, elastomeric member secured between piston 168 and valve body 158.

On the opposite side of inlet duct 180 of fluid passageway 178 is a diaphragm fluid flow metering member 186. This diaphragm is similar to diaphragm 184 and has its folded portion disposed within an annular space defined between the outer surface of piston 168 and the internal surface of valve body 152. Further, the folded portion is disposed proximate outlet duct 182. As piston 168 moves axially within valve body cavity 166, diaphragm 186 moves in a free-rolling action with the fold being moved relative to outlet duct 182.

A coil 190 is provided for biasing piston 168 to an initial location within cavity 166. Electrical current is supplied to coil 190 from an external source through current input channel 191. Lead wire 192 is connected to interior lead wire 193, which is in turn connected to post 194. Interior lead wire 193 is of sufficient length to remain connected to post 194 as piston 168 moves within cavity 166. Post 194 is retained on piston post 174. To complete the connection to coil 190, coil lead wire 195 is connected to post 194. Secured to end wall 159 of valve body section 158 is magnet 196. Magnet 196 and spacer portion 197 are secured to end wall 159 by bolt 177.

By introduction of electrical current to coil 190, an electrical field is generated which acts to repel or attract coil 190 with respect to magnet 196. Coil 190 thus acts to move piston 168 within cavity 166. By varying current flow to coil 190, piston 168 can be variably biased to a location within cavity 166. As will be apparent to those of skill in the art, the configuration of the magnet and coil could be rearranged or reversed, as for example, by placing the magnet on the piston and positioning the coil within the cavity to achieve piston biasing.

In use, fluid at a supply pressure is introduced to port 160 of valve 150. A control signal is applied to port 162. Piston 168 is displaced as a function of the control signal fluid pressure. Diaphragm 186 meters fluid flow through outlet duct 182 to establish an equilibrium pressure, $P_c + = P_c + P$, at output port 164, where P is the pressure equivalent to the force of coil 190 acting against magnet 196 on the effective area of the diaphragm.

Figure 8:
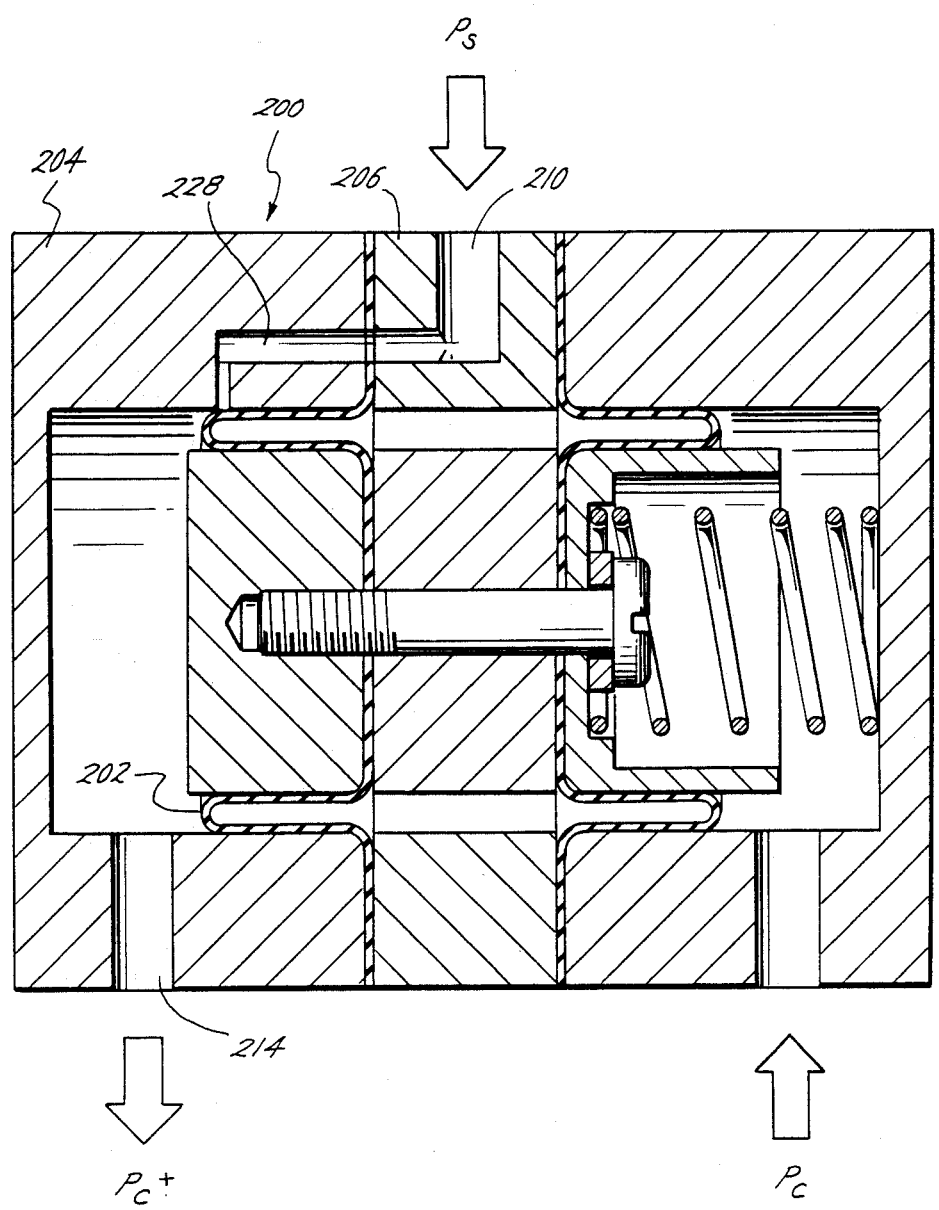
FIG. 8 is an alternate valve construction wherein the fluid passageway connecting the source pressure port and the output pressure port extends through the valve body rather than through the piston.

The foregoing description of the invention has been directed to particular illustrative embodiments for purposes of explanation and illustration. It will be apparent, however, to those skilled in this art that many modifications and changes in the valve apparatus may be made without departing from the essence of the present invention. For example, the construction may be reversed by putting the passageway in the valve body rather than through the piston. This is diagrammed in FIG. 8 which shows a valve 200 in which fluid passageway 228 extends through valve body sections 204 and 206. Diaphragm 202 regulates flow between the source pressure port 210 and the output pressure port 214. Although the diagram of FIG. 8 is similar to the design of FIG. 6, the function of the valves is different in that the device of FIG. 6 opens to accommodate a new source pressure and the device of FIG. 8 closes to accommodate a new source pressure. It is to be appreciated that the alternate passageway structures are equally applicable to the valve structure shown in FIG. 2. It is the intention that the following claims cover all equivalent modifications and variations as fall within the scope of the invention.

What is claimed is:

1. A control valve for metering fluid flow, comprising:
    a valve body having an internal cavity, a port for receiving fluid at a supply pressure, a port for releasing fluid at an output pressure, and a port for receiving fluid at a control signal pressure, the control signal pressure port not in fluid communication with the output pressure port;
    a piston disposed within the valve body cavity for movement therein in response to control signal fluid pressure, said piston having a fluid passageway therethrough for providing fluid communication between the supply pressure fluid port and the output pressure fluid port; and
    a spring for biasing the piston to an initial displacement location within the valve body cavity, so as to establish an initial output fluid pressure; and
    a diaphragm, for regulating fluid flow through the piston passageway as a function of piston displacement, to establish the output fluid pressure as a function of the control signal fluid pressure.

2. The valve of claim 1 wherein the diaphragm comprises a folded, elastomeric member disposed between the piston and the valve body.

3. The valve of claim 1 wherein the diaphragm comprises an elastomeric member disposed between the piston and the valve body, said memory having a folded portion for covering a variable portion of an outlet duct of the piston fluid passageway depending upon piston location within the valve body cavity.

4. A control valve for metering fluid flow, comprising:
    a valve body having an internal cavity;
    a port in the valve body for receiving fluid at a supply pressure;
    a port in the valve body for releasing fluid at an output pressure;
    a port in the valve body for receiving fluid at a control signal pressure, the control signal pressure port not in fluid communication with the output pressure port;
    a piston disposed in the valve body cavity for bidirectional movement in response to control signal fluid pressure;
    a spring for biasing the piston to an initial displacement location within the valve body cavity, so as to establish an initial output fluid pressure; and
    a diaphragm disposed in the valve body cavity and coupled to the piston, for metering fluid flow between the supply pressure port and the output pressure port as a function of piston displacement, to establish the output fluid pressure as a function of the control signal fluid pressure.

5. The valve of claim 4 wherein the diaphragm is a folded, elastomeric member.

6. A control valve for metering fluid flow, comprising:
    (a) a valve body with an internal cavity and having (i) a port for receiving fluid at a supply pressure,
(ii) a port for the release of fluid at an exhaust pressure,
(iii) a port for receiving fluid at a control signal pressure,
(iv) a port for releasing fluid at an output pressure, and
(v) a port for receiving fluid at an input pressure;

(b) a first piston disposed within the valve body cavity for movement therein in response to control signal fluid pressure, said piston having a fluid passageway therethrough for providing fluid communication between the supply pressure fluid port and the output pressure fluid port;

(c) a second piston disposed within the valve body cavity for movement therein in response to control signal fluid pressure, said second piston having a fluid passageway therethrough for providing fluid communication between the exhaust pressure fluid port and the input pressure fluid port;

(d) a first spring for biasing the first piston to an initial displacement location within the valve body cavity, so as to establish an initial output fluid pressure;

(e) a second spring for biasing the second piston to an initial displacement location within the valve body cavity, so as to establish an initial exhaust fluid pressure;

(f) a first diaphragm, for regulating fluid flow through the passageway of the first piston as a function of first piston displacement, to establish the output fluid pressure as a function of the control signal fluid pressure; and (g) a second diaphragm, for regulating fluid flow between the input fluid pressure port and the exhaust fluid pressure port as a function of second piston displacement, to establish the exhaust fluid pressure as a function of the control signal fluid pressure.

7. The control valve of claim 6 further comprising a third diaphragm for sealing between the control signal pressure fluid port and the supply pressure fluid port.

8. The control valve of claim 6 wherein each of the diaphragms comprises a folded elastomeric member.

9. The control valve of claim 8 wherein the folded portion of the first diaphragm covers a variable portion of an outlet duct of the passageway in the first piston depending upon the location of said piston within the valve body cavity.

10. The control valve of claim 9 wherein the folded portion of the second diaphragm covers a variable portion of the outlet duct of the passageway in the second piston depending upon the location of the second piston within the valve body cavity.

11. A control valve for metering fluid flow, comprising:
a valve body having an internal cavity, a port for receiving fluid at a supply pressure, and a port for releasing fluid at an output pressure;
means coupled to the valve body, for receiving a control signal input, the control signal input independent of the output pressure;
a piston disposed within the valve body cavity for movement therein in response to the control signal input, said piston having a fluid passageway therethrough for providing fluid communication between the supply pressure fluid port and the output pressure fluid port;
a spring for biasing the piston to an initial displacement location within the valve body cavity, to establish an initial output fluid pressure; and
a diaphragm, for regulating fluid flow through the piston passageway as a function of piston displacement, to thereby establish the output fluid pressure as a function of the control signal input.

12. The valve of claim 11 wherein the diaphragm comprises a folded, elastomeric member disposed between the piston and the valve body.

13. A control valve for metering fluid flow, comprising:
a valve body having an internal cavity, a port for receiving fluid at a supply pressure, a port for receiving fluid at a control signal pressure, and a port for releasing fluid at an output pressure;
a piston disposed within the valve body cavity for movement therein in response to control signal fluid pressure, said piston having a fluid passageway therethrough for providing fluid communication between the supply pressure fluid port and the output pressure fluid port;
a spring for biasing the piston to an initial displacement location within the valve body cavity, so as to establish an initial output fluid pressure;
a first diaphragm, for regulating fluid flow through the piston passageway as a function of piston displacement, to establish the output fluid pressure as a function of the control signal fluid pressure; and
a second diaphragm, for sealing between the control signal pressure fluid port and the supply pressure fluid port.

14. The valve of claim 13 wherein the second diaphragm comprises an elastomeric member disposed between the piston and the valve body, said member having a folded portion for rolling movement as the piston is displaced.

15. A control valve for metering fluid flow, comprising:
(a) a valve body with an internal cavity and having
(i) a port for receiving fluid at a supply pressure,
(ii) a port for the release of fluid at an exhaust pressure,
(iii) a port for releasing fluid at an output pressure,
(iv) a port for receiving fluid at an input pressure; and
(v) a port for receiving fluid at a control signal pressure, the control signal pressure port not in fluid communication with the output pressure port;

(b) a first piston disposed within the valve body cavity for movement therein in response to control signal fluid pressure, said piston having a fluid passageway therethrough for providing fluid communication between the supply pressure fluid port and the output pressure fluid port;

(c) a second piston disposed within the valve body cavity for movement therein in response to control signal fluid pressure, said second piston having a fluid passageway therethrough for providing fluid communication between the exhaust pressure fluid port and the input pressure fluid port;

(d) first spring for biasing the first piston to an initial displacement location within the valve body cavity, so as to establish an initial output fluid pressure;

(e) a second spring for biasing the second piston to an initial displacement location within the valve body cavity, so as to establish an initial exhaust fluid pressure;

(f) a first diaphragm, for regulating fluid flow through the passageway of the first piston as a function of first piston displacement, to establish the output fluid pressure as a function of the control signal fluid pressure; and (g) a second diaphragm, for regulating fluid flow between the input fluid pressure port and the exhaust fluid pressure port as a function of second piston displacement, to establish the exhaust fluid pressure as a function of the control signal fluid pressure.

16. The control vale of claim 15 further comprising a third diaphragm for sealing between the control signal pressure fluid port and the supply pressure fluid port.

17. The control valve of claim 15 wherein each of the diaphragms comprises a folded elastomeric member.

18. The control valve of claim 17 wherein the folded portion of the first diaphragm covers a variable portion of an outlet duct of the passageway in the first piston depending upon the location of said piston within the valve body cavity.

19. The control valve of claim 18 wherein the folded portion of the second diaphragm covers a variable portion of the outlet duct of the passageway in the second piston depending upon the location of the second piston within the valve body cavity.

* * * * *